May 5, 1970  P. M. WOOD  3,510,398
BURNABLE POISON RODS

Filed June 23, 1967  2 Sheets-Sheet 2

United States Patent Office 3,510,398
Patented May 5, 1970

3,510,398
BURNABLE POISON RODS
Phillip M. Wood, 513 Shady Ave., Apt. 22,
Pittsburgh, Pa. 15206
Filed June 23, 1967, Ser. No. 648,390
Int. Cl. C03c 3/08; G21c 7/04
U.S. Cl. 176—86             2 Claims

ABSTRACT OF THE DISCLOSURE

Boron-containing glass in the form of tubes is used in a nuclear reactor as a source of burnable poison. The glass tubes are sandwiched between metallic inner and outer tubes forming a rod with an internal axial void.

BACKGROUND OF THE INVENTION

In the nuclear reactor art, a type of neutron absorber or poison material generally known as 'burnable poison" has been employed. The burnable poison is capable of absorbing neutrons while producing no new or additional neutrons nor transforming to new poisons as a result of neutron absorption. One such burnable poison is boron. Boron, as it occurs in nature, consists of two isotopes, namely boron–10 and boron–11. Boron–10 on being irradiated by thermal neutrons undergoes the reaction $B^{10}+n^1 \rightarrow Li^7+He^4$; that is, a boron–10 atom plus one neutron yields lithium–7 plus helium–4. Boron–10 constitutes about 20% of the total boron content of natural boron and has a thermal neutron absorption cross-section of about 3,840 barns. In the reaction the boron–10 undergoes the thermal neutron absorption cross-section is reduced from 3,840 barns (for boron–10) to 0.033 barn for the products of the reaction. The boron–11 isotope on the other hand, constituting 80% of the total boron content, has a substantially smaller cross-section for absorbing neutrons, so that the boron–10 isotope is the component of principle interest in poison applications.

The use of a burnable poison has significant advantages in a nuclear reactor, in that (1) fuel loading of the fuel core can be greatly increased, leading to longer core life; (2) burnable poison can be introduced in sufficient quantity to lower the initial reactivity to about that existing at the end of core life, and, as a result, fewer control rods are required to control the reactor, and the rods are withdrawn further out of the core during operation, leading to improved power distribution; and (3) burnable poison can be placed in locations in the core which will effectively flatten the power distribution throughout the core.

A further advantage in the use of a burnable poison resides in the reduction of the moderator temperature coefficient of reactivity. Without burnable poison the moderator temperature coefficient of a pressurized or boiling water reactor has a large positive value due to the present practice of having boric acid in the water as a chemical shim. Large positive moderator coefficients have an adverse effect on the controllability of the nuclear plant and its safety. When the temperature rises during operation of the reactor, water containing boron expands and a proportionable amount is expelled from the area about the core, causing the reactivity to increase. The use of a separate source of solid boron as a burnable poison in the reactor permits a reduction in the amount of boric acid in the water, thereby enhancing the controllability and safety of the reactor.

The employment of a burnable poison at various locations in reactor cores, including within the fuel pellets, in the coatings on the pellets and in the cladding on the tubes, has met with mixed results. Attempts to provide fuel pellets having a burnable poison dispersed uniformly in the fuel component have been somewhat unsatisfactory, and, at best, call for special and expensive treatments for fuel pellets.

SUMMARY OF THE INVENTION

This invention is directed to a burnable poison rod in which the boron, the burnable poison, is included by employing a boron-containing glass, such as borosilicate glass, in the form of a tube. A borosilicate glass tube is enclosed within an envelope of zirconium or a stainless steel tube and has inserted therein a second smaller zirconium or stainless steel tube so that the borosilicate glass is, in effect, sandwiched between metal tubes. The rod thus formed has an internal axial void which provides a gas plenum to receive the gaseous reaction products, primarily helium gas, of the absorption of neutrons by the boron.

Boron-containing glass (that sold under the trademark "Pyrex" for example) is a relatively abundant and inexpensive material well adapted for incorporation in the burnable poison rod of this invention.

It is an object of this invention to provide means for employing a boron-containing glass, such as borosilicate glass, as a source of burnable poison for use in a nuclear reactor.

Other objects and advantages of the invention will, in part, be obvious and will, in part, appear hereinafter.

BRIEF DESCRIPTION OF THE DRAWINGS

FIG. 3 is a longitudinal cross-section of the burnable poison rod of this invention;

DESCRIPTION OF THE PREFERRED EMBODIMENTS

Figure 1:
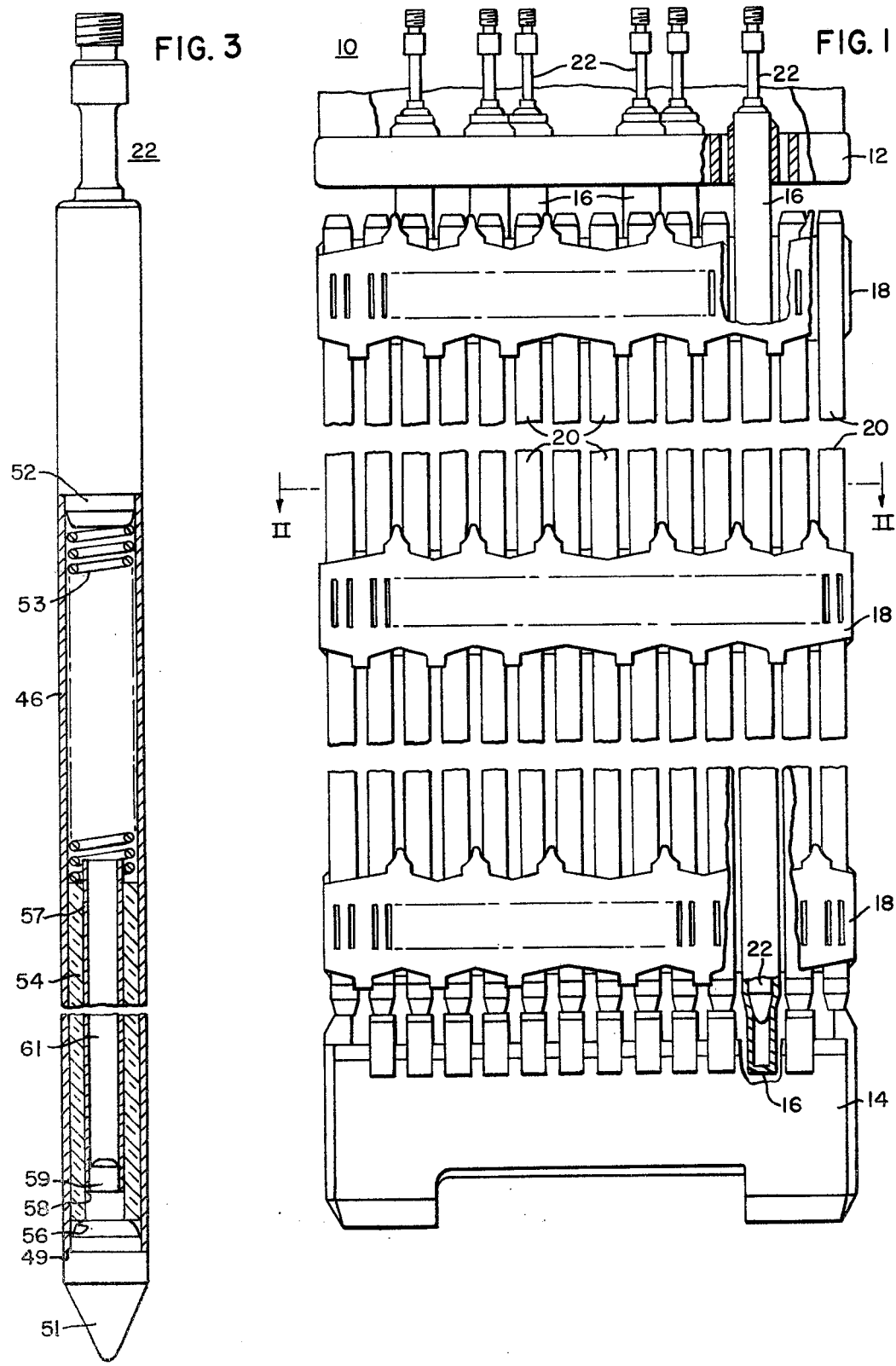
FIG. 1 is a fuel assembly which incorporates the burnable poison rods of this invention.
Figure 2:
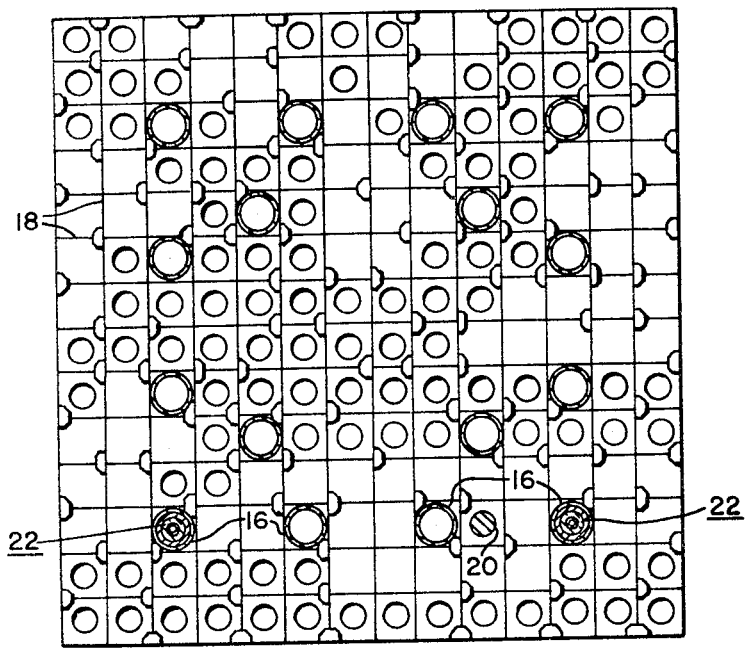
FIG. 2 is a view in section of the fuel assembly taken along line II—II of FIG. 1.

Referring to FIGS. 1 and 2 of the drawings, there is shown a fuel assembly 10 comprising an upper end structurn 12, a lower end structure 14, a plurality of elongated support thimbles 16, a plurality of positioning grids 18, a plurality of fuel elements 20 and a plurality of poison rods 22. To form fuel assembly 10, the longitudinally spaced grids 18 are first secured to the elongated support thimbles 16 and the lower end structure 14 is then secured to the lower end portions of the thimbles. The fuel rods 20 are inserted through the grids 18 from above and are vertically supported by the lower end structure 14. The upper end structure 12 is welded to the top end portions of thimbles 16 and then the poison rods 22 are inserted into the thimbles 16.

It will be understood that in operation, pressurized water freely circulates in a generally upward direction as viewed in FIG. 1 through the fuel assembly 10 and becomes heated in the process. Directly or indirectly the heated water forms the steam which is employed to drive a turbine.

In FIG. 3 there is shown a burnable poison rod 22 in one configuration in accordance with the invention. The poison rod includes an outer tube or cladding 46, an end plug 51 secured to and closing the lower end of the outer tube 46 at the shoulder 49, and a spring retaining assembly 52 secured to and closing the other end of tube 46 and holding coil spring 53 in operative position within the tube. One end of the coil spring 53 thus bears against the spring retaining assembly 52 and the other end bears against one end of a borosilicate glass tube 54. The glass tube 54 may be a single member or a plurality of tubular member aligned in end-to-end relationship within the outer tube 46. The spring 53 urges the glass tube 54 into engagement with the shoulder 56 on the end plug 51. An internal tubular member 57 of a smaller diameter than the glass tube 54 abuts the shoulder 58 of the end plug 51 and is secured to the terminal portion 59 thereof. The internal tubular member 57 defines a longitudinal void or gas plenum 61 at the axis of the poison rod.

Figure 4:
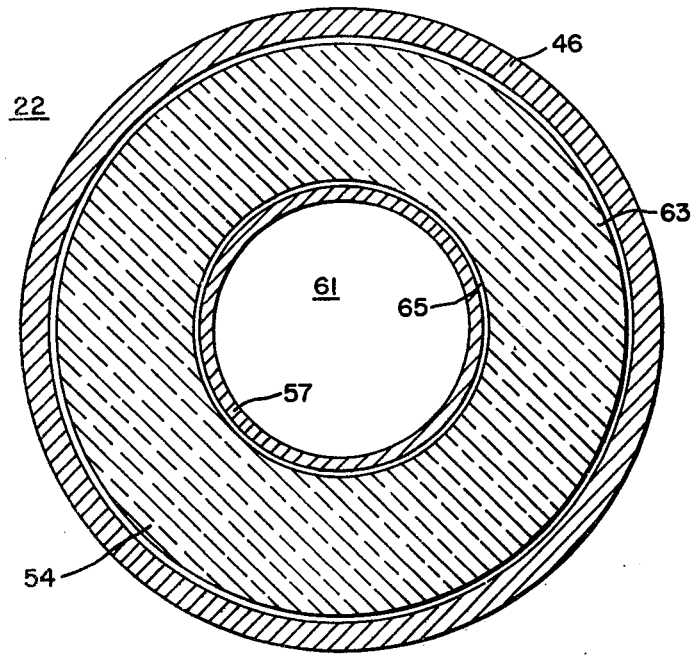
FIG. 4 is a transverse cross-section of the burnable poison rod of this invention.

In FIG. 4, the construction of the burnable poison rod 22 is seen in cross-section. The burnable poison rod consists of the outer cladding or tube 46 which may be composed of a zirconium base alloy such as zircaloy or stainless steel. Within this outer tube 46 is the tube 54 of borosilicate glass, such as is sold under the name "Pyrex." Between the outer tube and the borosilicate glass tube is a slight gap of the order of one to six thousandths of an inch to allow clearance for assembly. Internally of the borosilicate glass tube is the inner tubular member 57, for instance from 8 to 10 mils thick, of zirconium base alloy or stainless steel which is separated from the borosilicate glass tube by a small gap of the order of several thousandths of an inch. Within the inner tubular member 57 is a central axial chamber or void 61 which provides a gas plenum to accommodate the helium gas released as the result of the neutron reaction of boron–10.

Glasses containing from 2% to 25% by weight of $B_2O_3$ are suitable for the practice of the invention.

The preferred boron-containing glass employed in the poison rod of this invention is that borosilicate glass composition sold under the trademark "Pyrex." This glass has approximately the following composition:

| Constituent: | Weight, percent |
| --- | --- |
| $SiO_2$ | 81.0–80 |
| $Al_2O_3$ | 2.0 |
| $B_2O_3$ | 12.0–13.0 |
| $Na_2$ | 4.5 |
| Other | 0.5 |

Other borosilicate glasses and a high silica glass which may be used are:

| Constituent | Weight percent (approximate) | |
| --- | --- | --- |
| | Borosilicate | High silica |
| $SiO_2$ | 74.3 | 76.2 | 96.0 |
| $Al_2O_3$ | 5.6 | 3.7 | |
| $B_2O_3$ | 10.0 | 13.5 | 3.0 |
| $Na_2O$ | 6.6 | 5.4 | |
| CaO | 0.9 | 0.8 | |
| BaO | 2.2 | | |
| $K_2O$ | 0.4 | 0.4 | |
| Other oxides | | | 1.0 |

As an example of the structure of the poison rod of this invention, an outer zirconium alloy (zircaloy) or stainless steel tube having an outside diameter of 0.440 inch and a wall thickness of about 0.020 inch is provided. A borosilicate glass (Pyrex) tube having about 12.6 weight percent of $B_2O_3$ therein and an outside diameter of 0.394 inch and an inside diameter of 0.200 inch is positioned within the outer tube. An inner zirconium alloy or stainless steel tube having an outside diameter of 0.196 inch and a wall thickness of about 0.008 inch is positioned within the glass tube.

The boron-containing glass may shatter into an amorphous powder as it is irradiated. Thus, the burnable poison rod of this invention is constructed so that the glass is constrained between inner and outer metallic tubes and is not capable of substantial movement except for swelling or slumping. Slumping has little effect since the only space available for such movement is provided by the gaps between the metallic tubes and the glass tubes.

In one design as much as 20% swelling of the glass is accommodated by providing that the inner metallic tube is substantially weaker than the outer tube so that the inner tube will collapse without rupturing before the outer tube approaches failure. The void space occupied by the collapsing inner metallic tube is available for helium in the swollen glass. Since glass is an amorphous material, a helium release of close to 100% is achived. With 100% burnup of the boron–10 in the boron, with a gas space of 20% of the total volume inside the tube, the helium pressure would amount to about 2250 p.s.i. under operating conditions. The external pressure or the pressure external to the burnable poison rod in the nuclear reactor during operation is also about 2250 p.s.i. If lower internal gas pressures are desired, the void volume can be increased by increasing the internal diameter of the glass tube to accomplish this decrease in pressure, but this reduces the boron concentration and therefore, the number of burnable poison rods in the fuel assembly would have to be increased.

There has thus been provided an inexpensive burnable poison rod for incorporation in a nuclear fuel assembly.

In some cases, the borosilicate glass may be introduced as a powder into the annular space between tubes 46 and 57. However a glass tube can be inserted much more rapidly into a small annular cavity, and there is complete assurance that there are no unfilled spaces or cavities which could occur if a powder were to be employed.

I claim as my invention:

1. A burnable poison rod for use in a nuclear reactor, comprising an elongated external tubular member of predetermined length, an end plug having a shoulder thereon, said shoulder portion of the end plug being secured to one end of the external tubular member in gas sealing relation therewith, a spring retaining assembly secured to the other end of said external tubular member in gas sealing relation therewith, an internal tubular member disposed coaxially with the external tubular member and in spaced relation thereto, said internal tubular member being disposed in seating engagement with the end plug, extending longitudinally and terminating a predetermined distance below the spring retaining assembly defining a gas plenum along the axis of the rod, said external tubular member and said internal member cooperating to define an annular chamber extending longitudinally a predetermined distance, a borosilicate glass tubular member disposed within said annular chamber, and spring biasing means disposed to extend between the spring retaining unit and said glass tubular member for maintaining the glass tubular member within the confines of the annular chamber.

2. The burnable poison rod of claim 1 wherein the borosilicate glass tubular member has the approximate composition:

| Constituent: | Weight, percent |
| --- | --- |
| $SiO_2$ | 81–80 |
| $Al_2O_3$ | 2.0 |
| $B_2O_3$ | 12–13 |
| $Na_2O$ | 4.5 |
| Other | 0.5 |

References Cited

UNITED STATES PATENTS

| | | | |
| --- | --- | --- | --- |
| 1,815,812 | 7/1931 | Taylor | 106—54 |
| 2,035,318 | 3/1936 | Hood | 106—54 |
| 2,582,852 | 1/1952 | Shoemaker | 106—54 |
| 2,859,163 | 11/1958 | Ploetz et al. | 176—93 |
| 3,000,802 | 9/1961 | Worn et al. | 176—93 |
| 3,009,869 | 11/1961 | Bassett | 176—93 |
| 3,088,898 | 5/1963 | Busby et al. | 176—86 |
| 3,110,656 | 11/1963 | Mills | 176—93 |
| 3,258,352 | 6/1966 | Paymal | 106—54 |
| 3,267,000 | 8/1966 | Ashcroft et al. | 176—78 |

FOREIGN PATENTS 835,257   5/1960   Great Britain.

(Other references on following page)

OTHER REFERENCES

MND–M–1818, 1960 pp. III–2, III–24, III–26, III–31, III–32, III–36a, III–99.

MND–M–1853 (Add 1), 1961, pp. III (13, 14, 21, 22, 23, 25, 27, 28, 29, 30).

"Criticality Control," 1961, pp. 289, 297, 298, 306.

KAPL–1803, December 1957, pp. 61, 63.

Nuclear Science Abstracts, vol. 14, No. 3, 1960, pp. 368–369, No. 2804.

Nucleonics, May 1965, pp. 72, 73 (vol. 23, No. 5).

"Neutron Absorber Materials for Reactor Control," 1962, pp. 3, 4, 21, 22, 23, 24, 171, 214, 218–221.

CARL D. QUARFORTH, Primary Examiner

H. E. BEHREND, Assistant Examiner

U.S. Cl. X.R.

106—54; 176—68, 78, 93